Figure 1:
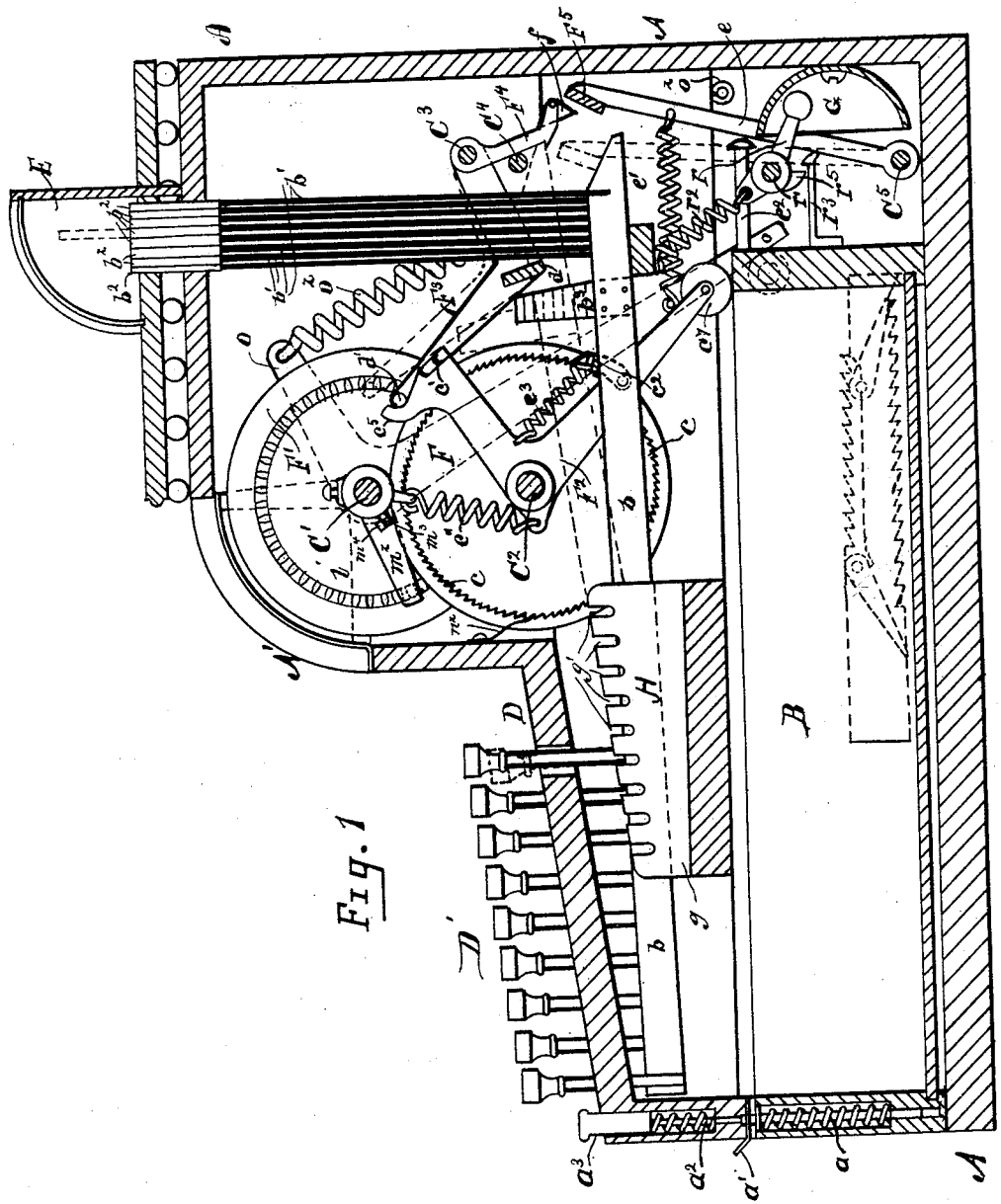

(No Model.)　　　　　　　　　　　8 Sheets—Sheet 1.
S. P. WATT.
CASH REGISTER AND INDICATOR.

No. 434,897.　　　　　　　Patented Aug. 19, 1890.

WITNESSES
C. C. Shepherd
W. H. Taft

INVENTOR
Sevn P. Watt.

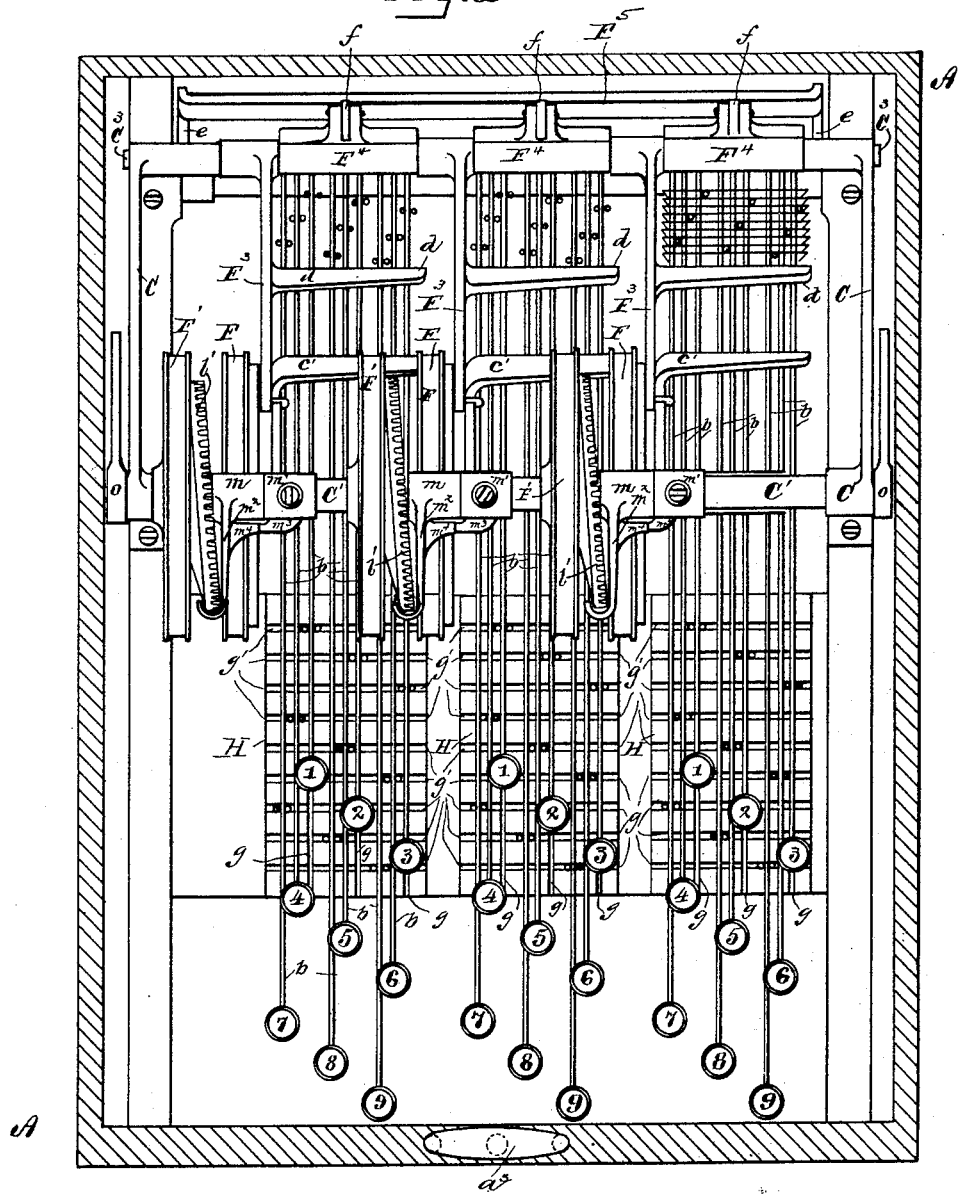

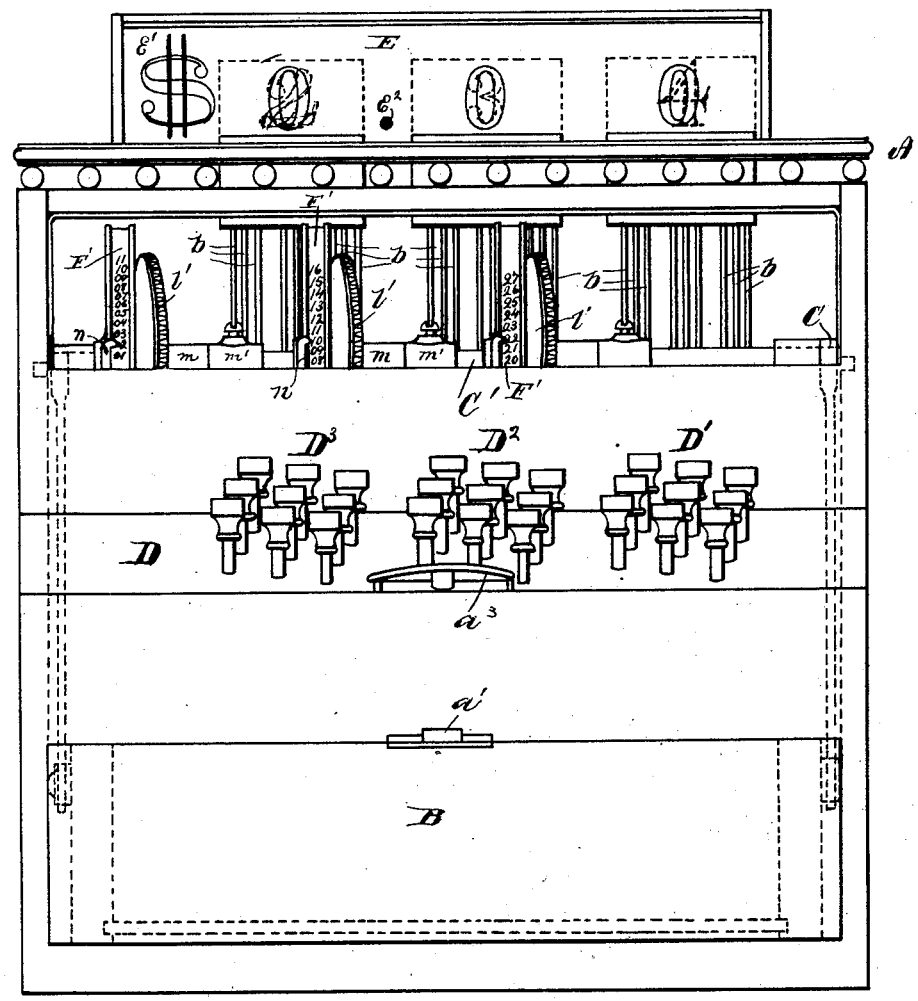

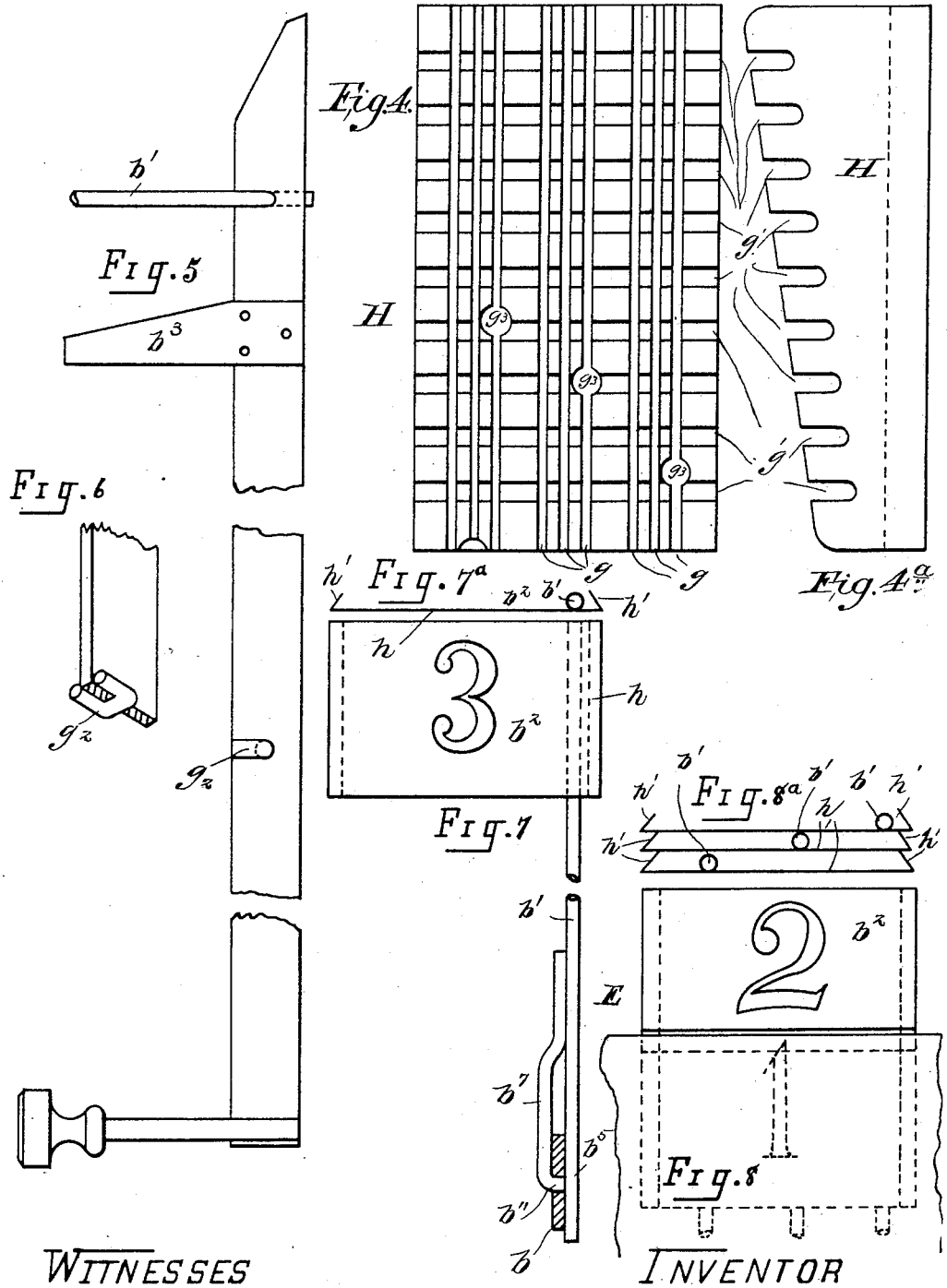

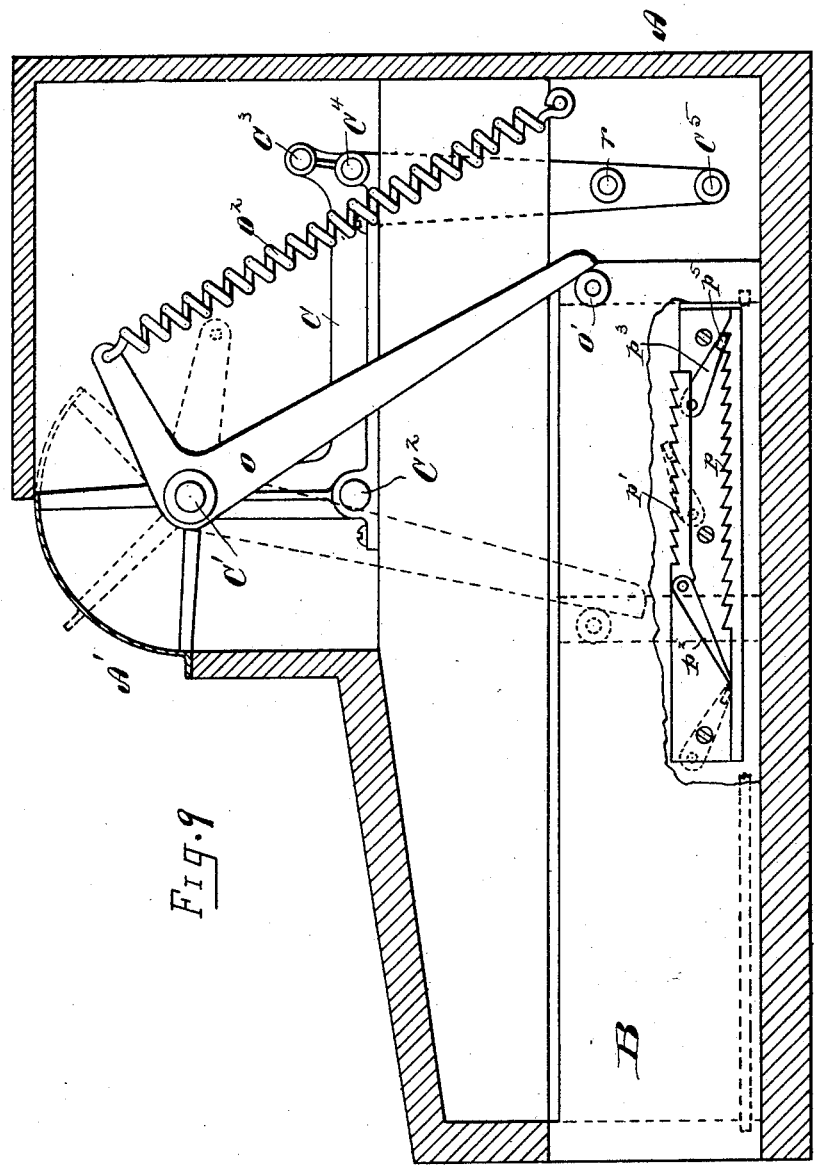

(No Model.) 8 Sheets—Sheet 6.
S. P. WATT.
CASH REGISTER AND INDICATOR.
No. 434,897. Patented Aug. 19, 1890.
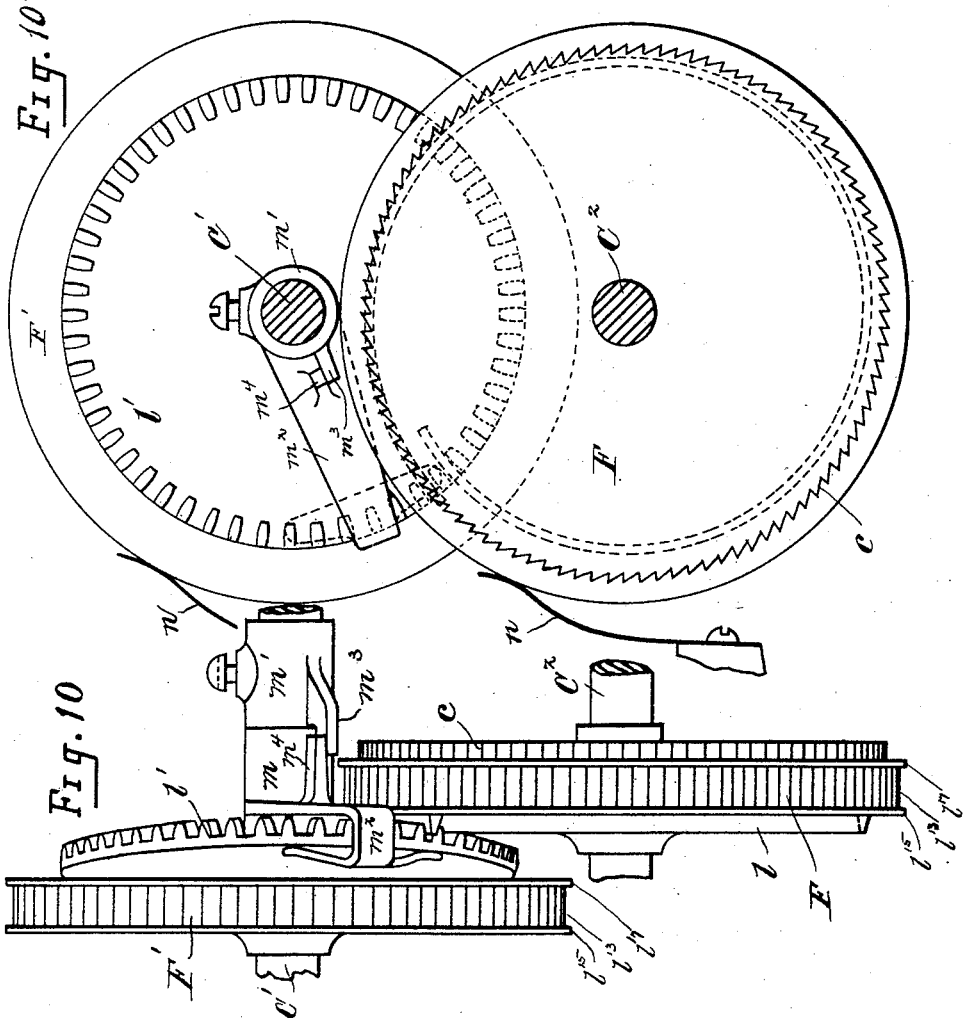
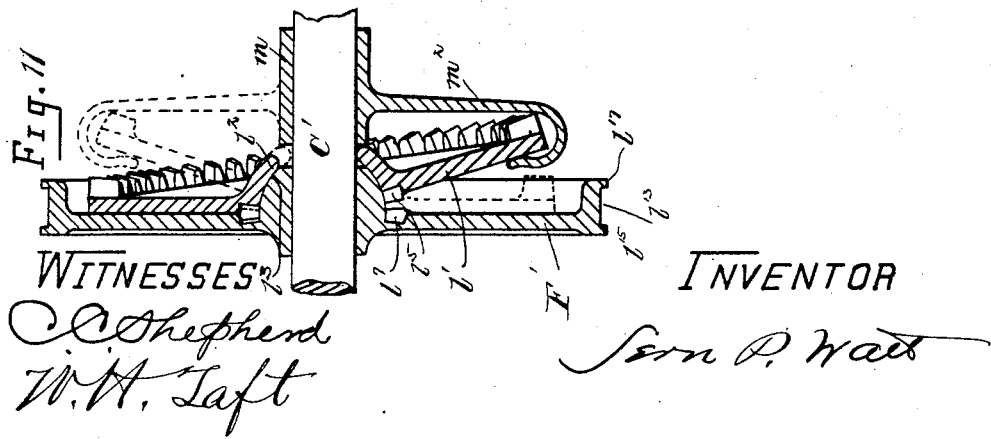
WITNESSES:
C. C. Shepherd
W. H. Taft
INVENTOR
Sern P. Watt (No Model.)　　　　　　　　　　　　　　　　　　　8 Sheets—Sheet 7.
S. P. WATT.
CASH REGISTER AND INDICATOR.
No. 434,897.　　　　　　　　　　　Patented Aug. 19, 1890.
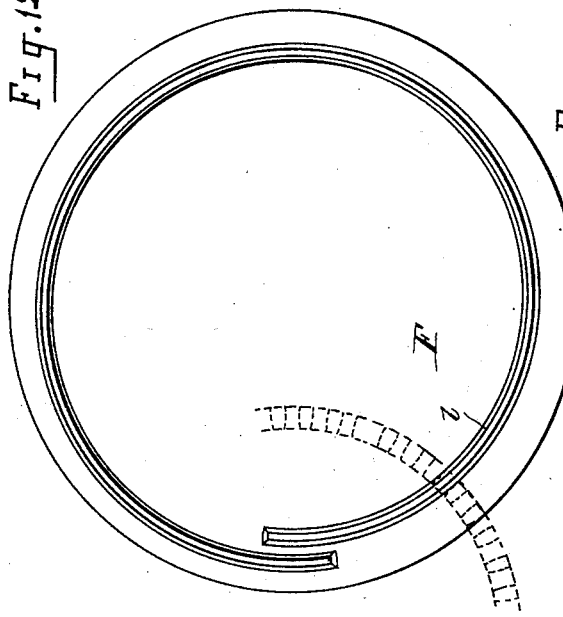
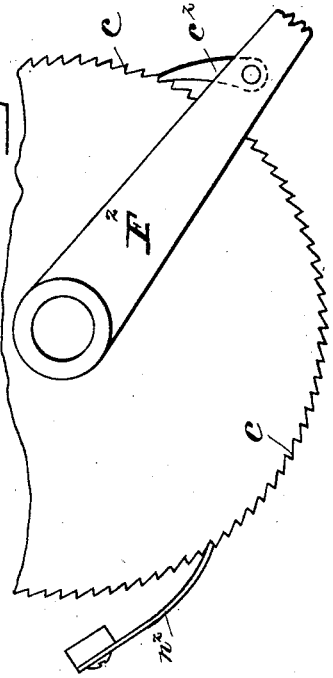
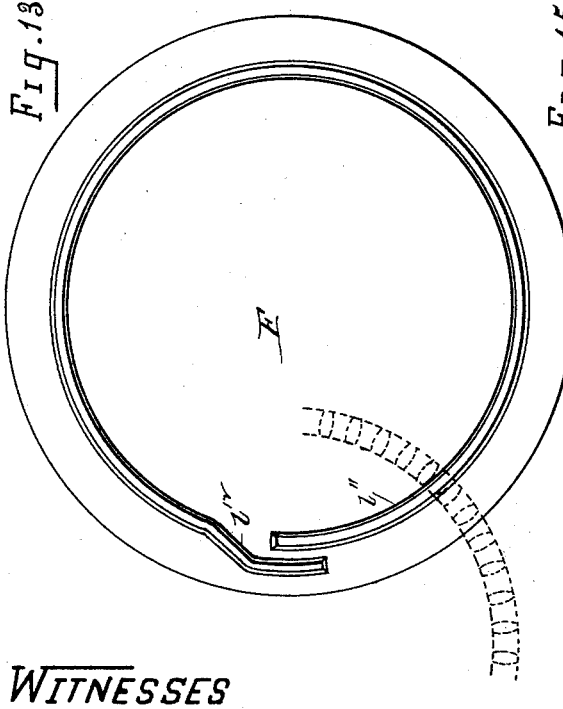
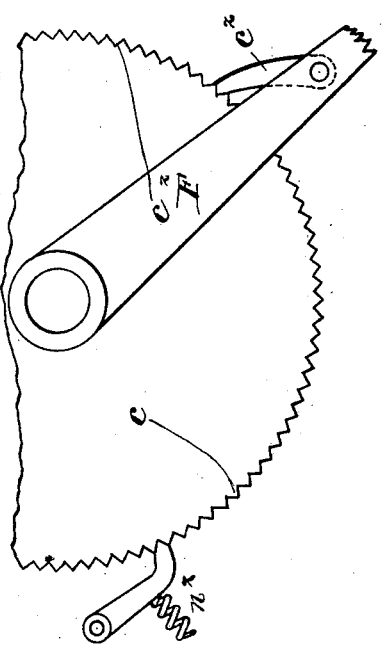
WITNESSES　　　　　　　　　　　INVENTOR

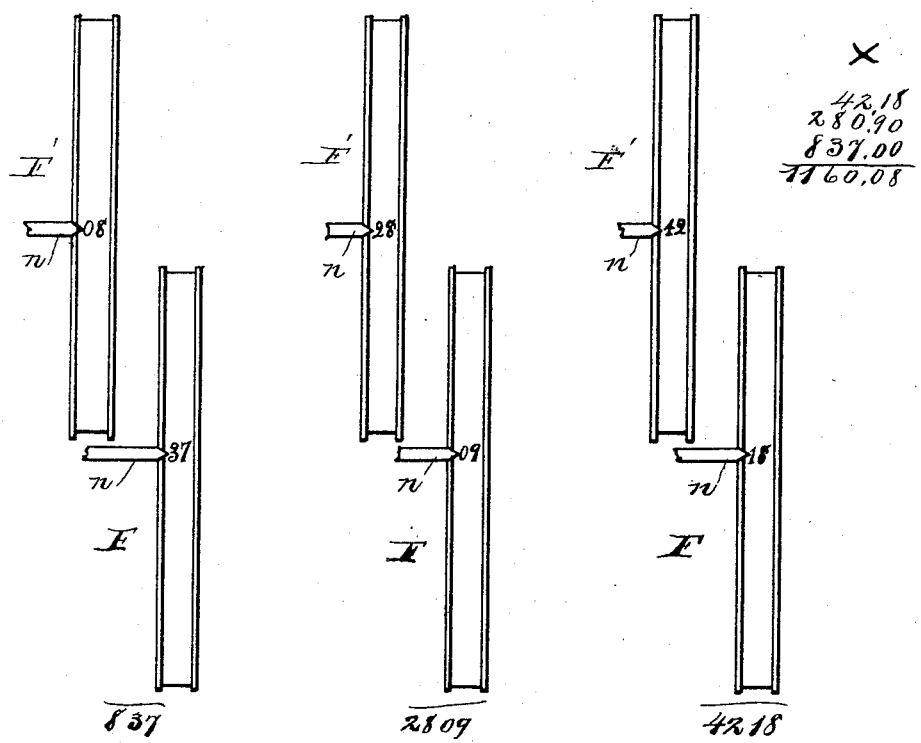
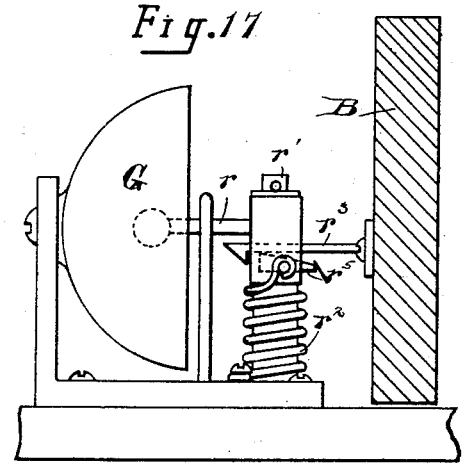
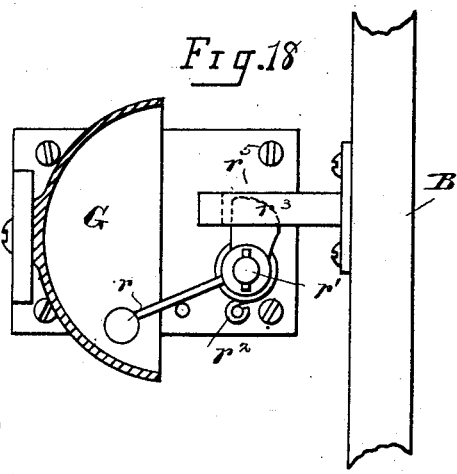

UNITED STATES PATENT OFFICE.

SERN PERLEY WATT, OF COLUMBUS, OHIO, ASSIGNOR, BY DIRECT AND MESNE ASSIGNMENTS, TO THE COLUMBUS CASH REGISTER COMPANY, OF OHIO.

CASH REGISTER AND INDICATOR.

SPECIFICATION forming part of Letters Patent No. 434,897, dated August 19, 1890.

Application filed January 25, 1890. Serial No. 338,059. (No model.)

*To all whom it may concern:*

Be it known that I, SERN PERLEY WATT, a citizen of the United States, residing at Columbus, in the county of Franklin and State of Ohio, have invented certain new and useful Improvements in Cash-Registers, of which the following is a specification.

My invention relates to that class of registering devices which are used, in connection with a cash-receptacle, to register the respective amounts placed therein.

The object of my invention is to provide means by which the amounts registered are added together, so that it is only necessary to take the sums total in ascertaining the total amount placed in the cash-receptacle.

A further object of my invention is to provide means whereby the full and exact amount of any one purchase may be shown and registered upon the machine and be read therefrom in regular numerical order.

A further object of my invention is to provide means whereby any amount may be indicated and any mistake therein readily corrected before the same is finally registered and counted.

To this end my invention consists in the arrangement, with a cash-receptacle, of a number of visible signals or indicators and a registering mechanism, the visible signals or indicators being adapted to be operated independent of the opening of the cash-receptacle and independent of the registering device, means being provided by which the amount indicated by the visible signals will be automatically registered by the operation of the cash-receptacle.

My invention further consists in providing means by which the operating mechanism and the visible signals will be automatically locked while the cash-receptacle is opened.

My invention further consists in providing, in connection with a cash-receptacle and a registering device, means for indicating the amount to be registered independent of the registration, which means shall also set the registering device to register the amount indicated, the registering being accomplished by the operation of the cash-receptacle.

My invention further consists in providing, in connection with a cash-receptacle and a registering device, an indicating mechanism adapted to be operated independently of the operation of the cash-receptacle or the registering device, together with means for registering the amount so indicated by the operation of closing the cash-receptacle.

My invention further consists in the various constructions and combinations of parts hereinafter described, and set forth in the claims.

In the accompanying drawings, Figure 1 is a sectional elevation of a device embodying my invention. Fig. 2 is a plan view of the same with a portion of the outer casing removed. Fig. 3 is a front elevation view of the same with the casing shown open for reading the counting-wheels. Figs. 4 and 4ᵃ are respectively a plan and a side elevation view of the block or seats in which the operating-levers are supported and operated. Fig. 5 is a side elevation view of one of the operating-levers. Fig. 6 is a detailed view of a portion of the same, showing the supporting pivot or fulcrum. Figs. 7 and 7ᵃ are respectively a side elevation and a top view in detail of one of the indicators. Figs. 8 and 8ᵃ are respectively a front and top view showing the arrangement and operation of the indicators in the casing. Fig. 9 is a side elevation view, partly in section, showing the outer casing, the supporting-frame, and a portion of the cash-receptacle mechanism. Figs. 10 and 10ᵃ are respectively a front and side view of the registering and counting wheels in detail. Fig. 11 is a sectional view of a counting-wheel and its connecting mechanism. Figs. 12 to 15, inclusive, are detailed views of the registering and counting wheels, hereinafter referred to and more fully described. Fig. 16 is a diagram view illustrating the method of reading the registration and securing the totals from the counting and registering wheels. Figs. 17 and 18 are detailed views illustrating the construction and operation of the alarm mechanism in connection with the cash-receptacle.

Like parts are indicated by similar letters and figures of reference throughout the several views.

In the said drawings, A A represent an outer casing, which may be of any suitable size and formed of any desired material, cabinet-work or light metal, suitably ornamented and nickel-plated, being preferred.

B is a cash-receptacle, which is preferably made in the nature of a drawer adapted to slide in a suitable compartment in the bottom of the casing A A. The cash-receptacle B is held in a closed position within the casing A A by means of a spring-bolt $a$, which is preferably located within the front portion of the drawer or receptacle and adapted to engage with a suitable locking-plate $a'$ in the front of the casing. A push-rod $a^2$, extended upwardly through the casing A and terminating in a suitable knob or handle $a^3$, rests against the top of the spring-bolt $a$, and when the push-rod is pressed downwardly disengages the spring-bolt from the plate $a'$ and permits the cash-receptacle to be opened.

Secured within the casing A A, above and to the rear of the cash-receptacle B, is a main supporting-frame, which consists, essentially, of end plates C, connected together by suitable rods or shafts $C'$, $C^2$, $C^3$, $C^4$, and $C^5$. On this supporting-frame the registering devices are connected and supported.

Above the cash-receptacle and in front of the frame C is a key-board D, having a number of keys arranged in series thereon, with nine keys in each series, the respective keys in each series being numbered from one to nine. Any number of series of keys may be used, and each key of the respective series in the operation of the machine represents an amount just ten times as great as the corresponding key in the next preceding series.

In practice with my cash-registering device I preferably use three series of keys $D'$ $D^2$ $D^3$, representing, respectively, dollars, dimes, and cents. For convenience in operating, the keys in the respective series are preferably arranged as shown in Fig. 2, in which the corresponding key in each series occupies the same relative position.

Immediately under each series of keys is a series of operating-levers $b$, one lever for each key. These levers $b$ are each pivoted at a suitable point below the key-board and connected at their opposite ends by suitable connecting-links $b'$ to indicators $b^2$, on which are printed numbers corresponding to the numbers on the keys. These indicators $b^2$ are adapted as the key is depressed to rise at the top of the machine and expose the number thereon. For this purpose I preferably arrange at the top of the casing A A a small case or compartment E, preferably arranged with a glass front and top. Into this compartment the indicators are adapted to rise, and in the normal position of the levers $b$ these indicators stand below the floor of the compartment E, and are invisible from the front of the machine. It will be understood that each series of indicating-cards or indicators is arranged opposite the respective series of keys.

At the back of the compartment E and immediately back of the point where the indicating-cards of each series will rise I place a nought or cipher, and at the left of the dollar series I place a dollar-mark ($), and at the right of the dollar series a decimal-point (.), as indicated at $E'$ and $E^2$ on Fig. 3. It will be understood that these noughts and signs are permanently printed or otherwise affixed at the back of the compartment E. It will be seen now that if the key numbered 2 of the dollar series were depressed the indicating-card marked 2 in the dollar series of indicators would rise and take the place of the nought or cipher in the compartment E. The other ciphers in the compartment being uncovered, the amount would read "$2.00." If now the 3-key in the dimes-column were depressed, the indicating-card corresponding to this key would be raised and cover and thus displace the nought in the dimes-column, and the amount would then read "$2.30." If now the 4-key in the cents column or series were depressed, the indicating-card corresponding to this key would be elevated and the amount at the top of the machine would read "$2.34," as indicated by dotted lines in Fig. 3. It will thus be seen that any amount may be indicated at the top of the casing up to nine dollars and ninety-nine cents, any amount indicated being shown at the top of the casing in proper numerical order, and in dollars or fractions thereof. If it is desired to register or indicate more than nine dollars and ninety-nine cents at any one time, additional series of keys will be provided for this purpose.

Arranged within the frame C and journaled on the shafts or rods $C'$ and $C^2$ are a series of registering-wheels F and counting-wheels $F'$, one registering-wheel and one counting-wheel being used for each series of keys and levers. The registering and counting wheels of one series of levers and keys are the exact counterpart of the registering and counting wheels of the other series, but have no connection therewith, except that for convenience and simplicity in construction, all the counting-wheels are journaled on the shaft $C'$ and all the registering-wheels on the shaft $C^2$. In fact, each series of keys, levers, and indicators, together with their registering and counting mechanism, is exactly the same as the next series, the parts being simply duplicated as often as required to secure the desired capacity of the machine. It will be necessary, therefore, to describe the construction and operation of one only of these registering devices in connection with its keys, levers, and indicators.

The periphery of each of the counting and registering wheels is divided into one hundred parts, preferably numbered from zero to ninety-nine. On the side of each of the wheels I construct a ratchet $c$, having a series of teeth corresponding to the numbers on the periphery of the wheel. Journaled on the shaft $C^2$ at the side of each of the registering-wheels is a bell-crank lever $F^2$, one arm of which has a projecting spur $c'$, arranged above and extending transversely across the entire series of levers $b$. The other arm of the bell-crank lever $F^2$ is provided with a pawl $c^2$, pivoted thereon and adapted to be held in engagement with the ratchet $c$ by a spring $c^3$.

Pivoted to the rod $C^3$ is an L-shaped lever $F^3$, having a laterally-projecting spur $d$, which extends transversely above and across all the levers $b$ of the series. This lever $F^3$ is also provided at its outer extremity with a projecting stud $d'$, adapted to engage in a hook-shaped projection $c^5$ on the bell-crank lever $F^2$, which I term the "registering-lever." Also pivoted to the rod $C^3$, but independent of the retaining-lever $F^3$, is a swinging catch $F^4$, which in the normal position rests against the rod $C^4$, which forms a stop therefor. This swinging catch $F^4$ is made slightly wider than the total width of the entire series of levers $b$, and is adapted to engage with and retain any lever in the series when the key is sufficiently depressed to elevate the lever against the stop rod $C^4$, as indicated by dotted lines in Fig. 1. The end of each of the levers $b$ and the lower end of the swinging catch $F^4$ are preferably beveled, as shown, so that as each lever is raised the contact of the beveled surfaces will cause the swinging catch to move back sufficiently to permit the lever to pass and then drop under and retain the same in an elevated position. If desired, a suitable spring may be used in connection with the swinging catch $F^4$, to secure a more positive action thereof.

Each of the levers $b$ is provided near its rear end with an upwardly-projecting finger $b^3$, the projecting fingers on each lever being constructed of different lengths corresponding to the number of the lever, the 1-lever having the longest projection and the 9-lever the shortest projection of the series. These projections as the keys are depressed are adapted to come into position to receive the projecting spur $c'$ on the registering-lever when the same is released and permitted to turn on its pivotal center about the shaft $C^2$. The height of this projection therefore determines the movement of the pawl $c^2$ about the ratchet $c$ as the registering-lever $F^2$ drops into position.

Immediately in the rear of the levers $b$ and between the same and the swinging catch $F^4$ is a locking-bar $F^5$. This locking-bar $F^5$ extends entirely across the casing A A, and is pivoted by means of suitable arms $e$ to the transverse bar $C^5$ of the main frame. Springs $e'$, attached to the arms $e$ at one end and at the other to a suitable portion of the frame, serve to draw the locking-bar $F^5$ toward and above the rear ends of the operating-levers $b$. The locking-bar $F^5$, however, is held in its normal position away from said levers by the cash-receptacle B, this being accomplished when a sliding drawer is used by means of projecting studs $e^2$, attached to the end of said drawer and bearing against the arms $e$.

It will be understood that the registering-lever $F^2$ is held in its normal position, as shown in Fig. 1, by the retaining-lever $F^3$. It is also held in its normal position when the cash-receptacle is closed by a suitable connection with said cash-receptacle. When the sliding drawer B is used, this is preferably accomplished by extending the lower arm of the registering-lever $F^2$ and providing said arm with a roller $c^7$, adapted to come in contact with and bear against the said drawer B. A spring $c^{11}$, attached at one end to the registering-lever $F^2$ and at the other to a suitable sleeve on the shaft $C'$, serves to move said lever about its pivotal center when released by the retaining-lever $F^3$ and the opening of the cash-receptacle.

Immediately in the rear of the cash-receptacle B is an alarm-bell G, adapted as the cash-receptacle is opened to sound an alarm. This bell G and its operating mechanism may be constructed in any suitable or desirable manner, though the preferable construction will be hereinafter more fully described.

It will be seen now from the constructions as thus far described that when any one of the keys of a series is depressed to elevate the indicator, as before described, its lever will come against the projecting spur $d$ of the retaining-lever $F^3$, which will withdraw the projecting stud $d'$ from contact with the registering-lever, thus unlocking the same. At the same time the end of the lever will be engaged by the swinging catch $F^4$ and the lever retained in position. The projecting finger $b^3$ will at the same time be brought into position to meet and form a stop for the projecting spur $c'$ on the registering-lever when the same shall be released by opening the cash-receptacle. It will be understood that any key in any or all the series may be thus depressed, the operation in each case being the same, the amount determined by the respective keys being indicated at the top of the device, as before described. In this position and before the cash-receptacle is opened, if it should happen that a mistake had been made in the amount indicated the mistake may be rectified by pressing the proper keys and elevating the corresponding levers and indicators. As the proper lever is elevated it opens the swinging catch $F^4$ and releases the lever of the key which was previously depressed, the last key depressed being held in position by the spring-catch and the corrected amount indicated above. It will be seen that all this operation is independent of the registering mechanism and may be repeated or changed as often as desired without changing or affecting the registering and counting wheels so long as the cash-receptacle remains closed and no alarm is sounded. When the proper amount has been indicated, however, and the cash-receptacle opened by pressing on the push-rod $a^3$, an alarm will be sounded on the bell G, and the registering-lever $F^2$ will be released as the drawer is moved outwardly and will turn about its pivotal center until the projecting spur $c'$ comes against the projecting finger $b^3$, the lower portion of the said registering arm and its roller $c^7$ dropping down behind the drawer B, which forms the cash-receptacle. As the drawer B is opened the locking-bar $F^5$ is at the same time released and is drawn by the spring $e'$ over the ends of all the levers $b$ in each series which remain in their normal position. All the levers are thus securely locked, and the amount indicated by the indicator E cannot now be changed so long as the cash-receptacle remains open. After the amount indicated has been deposited into the cash-receptacle, the said receptacle is closed. The closing of the receptacle moves the registering-lever $F^2$ to its normal position, and in so doing turns the registering-wheel F a number of notches corresponding to the number of the depressed key in that series, thus registering the exact amount indicated.

It will be understood that the registering-levers for each series of registering-wheels are independent and each when released moves about its ratchet-wheel a number of notches corresponding to the number of the key depressed in the series to which it belongs. Each registering-lever will be moved by the closing of the cash-receptacle a sufficient distance to bring it to its normal position, and thus revolve its registering-wheel a number of notches corresponding to the number of the key depressed in the series.

Pivoted at the rear of each of the swinging catches $F^4$ is a small triangular latch $f$, which projects below the said swinging catch and is adapted to be moved about its pivotal center when engaged on one side, but is held against movement when engaged on the other side. As the cash-receptacle is opened the locking-bar $F^5$ passes under this latch to the position before described and as indicated in dotted lines in Fig. 1. When the cash-receptacle is closed and the locking-bar $F^5$ forced back to its normal position, said bar comes in contact with the latch $f$ on each of the swinging catches $F^4$ and carries said catches back sufficiently to release the levers engaged thereby, after which, the locking-bar $F^5$ having passed the latch $f$, the swinging catches resume their normal positions.

To provide for pivoting the various levers at different points in their length, in order to secure the proper arrangement of keys, as well as the proper movement of said levers, I provide for each series of levers a supporting or bearing block H, each of said blocks being provided with a series of longitudinal grooves $g$, corresponding to the number of levers, and a series of transverse grooves $g'$, corresponding to the number of points at which said levers are to be pivoted. In the present case and with the arrangement as shown I use one longitudinal groove for each lever and one transverse groove for each lever. The pivot proper I form by producing an opening in the lever and passing a short wire $g^2$ through the same and bending the ends upwardly on each side of the lever into a U shape, as shown in Figs. 5 and 6. The longitudinal grooves in the supporting-block H are made deeper than the transverse grooves, and when a lever is placed in its longitudinal groove the pivot-wire is placed in its proper transverse groove. The levers are adapted to work freely in the longitudinal grooves, but are held against longitudinal movement by the sides of said grooves. The pivot-wires in the transverse grooves prevent any longitudinal movement of the levers, while at the same time the levers are free to turn or pivot on said wires.

By bending the ends of the pivot-wires, as described, they are securely attached to the levers and always in place. It is evident, however, that the bending of the pivot-wires might be dispensed with by forming the pivot-wires in the nature of trunnions secured in said levers. For the shorter levers, which end in the length of the block, I preferably provide small openings or sockets $g^3$, as shown in Fig. 4, to receive the key-stems, where they are secured to the levers. It is evident, however, that by making the levers of sufficient length and changing the location of the block H these openings or sockets could be dispensed with.

In order that the indicators $b^2$ may work freely as the levers $b$ are moved and at the same time keep the said indicators within a small space, I preferably form each of the indicators of a plate $h$ of thin sheet metal, having the ends thereof bent downwardly and inwardly to form guides or ribs $h'$, the guides or ribs $h'$ of one indicator being adapted to rest against the outer surface of the next succeeding indicator, as shown in Fig. 8$^a$. The connecting-link $b'$ of each indicator is secured by soldering or otherwise to the back of the plate $h$ and between the guides or ribs $h'$, the arrangement of the levers and the said links being such that the connecting-links $b'$ will be attached to each succeeding plate at a different point in the width thereof, as also shown in Fig. 8$^a$. The figures on the indicators may be printed directly thereon or on suitable paper or card-board attached to the said plate $h$. By this construction the indicators are adapted to move freely in their places, and at the same time are held against displacement in small compass. The plate $h$ of each indicator is preferably made in its vertical height longer than the upward movement thereof, so that the ribs $h'$ of each plate is always in contact with the next succeeding plate, as illustrated in Fig. 8.

In attaching the connecting-links $b'$ of the indicators to the operating-levers $b$, I preferably form each of the connecting-links with a straight projecting leg $b^5$, adapted to extend down along one side of said lever, a side arm $b^7$ being connected to said straight leg and extended parallel therewith at a distance equal to the thickness of said lever, the said projecting arm $b^7$ being provided with an inwardly-projecting point or stud $b^{11}$, adapted to pass through a suitable opening in said lever, as shown in Fig. 7. The straight projecting leg $b^5$ and the side arm $b^7$ are preferably formed of resilient metal, so that by pressing the same apart the lever may be removed therefrom or connected thereto, as occasion may require. If desired, the straight leg $b^5$ and the projecting arm $b^7$ may be formed integral; but I preferably form them of separate pieces of ordinary Bessemer-steel wire or other suitable material and solder or braze them together.

As before stated, a registering-wheel F and a counting-wheel F' is used for each series of levers. The registering-wheel, as above described, is adapted to be moved one notch for each unit of the series on the keys depressed—that is, the registering-wheel corresponding to the cents series of levers moves one notch for each cent, the registering-wheel of the dime series moves one notch for each dime, and the registering-wheel of the dollar series moves one notch for each dollar in the amount registered. The counting-wheels of the respective series simply register the revolutions of the register-wheels, and are adapted to move one notch for each one hundred units registered on said registering-wheels.

To secure the proper movement of each of the counting-wheels with reference to the registering-wheels, I provide on one side of the registering-wheels and on that side opposite to the ratchet $c$ a spiral thread or worm $l$, adapted to engage in the teeth of a worm-gear $l'$. This worm-gear $l'$ is provided at the center with a concave hub $l^2$, having a bearing on a convex hub $l^3$ of the counting-wheel F'. The worm-gear $l'$ and the counting-wheel F' are each provided with a series of beveled gear-teeth $l^5$ and $l^7$, adapted to engage and connect the said worm-gear and counting-wheel and cause the same to revolve together.

Located on the shaft C', which supports the counting-wheels, is a loose sleeve $m$ for each of said counting-wheels, and a collar $m'$ at the end of said loose sleeves. The sleeve $m$ is provided with a projecting arm $m^2$, the outer end of which is extended around the periphery of the worm-gear $l'$ and adapted to bear against the back thereof, as shown in Figs. 10 and 11. On the collar $m'$ is a projecting lug or spur $m^3$, and a similar projection $m^4$ on the arm $m^2$, the said projections being adapted to come in contact and form a stop for the lever $m^2$ and limit its movement about the periphery of the worm-gear $l'$. The collar $m'$, it will be understood, is secured to the shaft C', while the sleeve $m$ turns freely thereon. The worm-gear $l'$ stands at an angle to the plane of the counting and registering wheels, and when the lever $m^2$ is in its normal position the teeth of the worm-gear are adapted to engage with the worm on the registering-wheel at one point only and receive motion therefrom. By moving the lever $m^2$ about the shaft C', however, the worm-gear $l'$ will be oscillated on its bearing on the convex hub $l^3$, as indicated by dotted lines in Fig. 11, and its teeth will be withdrawn from contact with the worm, thus disengaging the counting-wheel from the registering-wheel to permit the wheels to move independently, and thus be readily returned to zero at the normal starting-point. By reason of the gear-teeth $l^5$ and $l^7$ on the worm-gear and counting-wheel, respectively, these gear will always remain connected together, no matter what position the worm-gear $l'$ may assume.

Instead of a regular spiral worm $l$ on the registering-wheel F, a projecting flange $l^{11}$ may be provided concentric with said registering-wheel, except at the point $l^{12}$, where it is formed cam-shaped, as shown in Fig. 13. By this construction the counting-wheels remain stationary during the greater part of the revolution of the registering-wheels, and a quick movement of one space is secured in the counting-wheel just before the termination of the revolution of the registering-wheel.

I preferably construct the periphery of both the counting and registering wheels with a groove $l^{13}$ and side flanges $l^{15}$ and $l^{17}$. The numbers and graduations on the periphery of the wheel are formed on suitable strips of flexible material, preferably of paper, which are afterward cemented or otherwise secured within the groove $l^{13}$.

Means are provided for indicating the proper number on each of the wheels. This I preferably accomplish by providing a small spring $n$, adapted to bear on the side flanges $l^{15}$ and $l^{17}$, respectively, and extend across the groove $l^{13}$ and indicate the proper number on each of the respective counting and registering wheels. These springs also furnish a certain amount of friction to prevent the wheels moving too far or being accidentally moved in the operation of the machine. Instead of the springs $n$, however, small pointers or indices $n'$ may be used to indicate the proper number, as shown in Fig. 3. In this case it may be desirable to provide other means for preventing the accidental movement of the registering-wheel—such, for instance, as a spring $n^2$, adapted to bear against the ratchet $c$ on the registering-wheels.

Pivoted on the shaft C' at each side of the machine is a bell-crank lever $o$, one end of which is extended down and rests against a roller $o'$ in the side of the cash-drawer B. To the opposite end of the bell-crank lever is attached one end of a spring $o^2$, the other end of which is connected at some convenient point to the frame or casing. When the drawer is released by pressing down the push rod $a^2$, as before described, these springs $o^2$, acting through the medium of the bell-crank arms $o$, force the drawer open.

In order to insure the perfect working of the machine, it is desirable that means be provided for insuring a certain amount of movement to the drawer in opening and closing. It is also desirable that when the drawer is pushed inwardly to close the same it cannot again be drawn out until entirely closed; otherwise the proper registration might be disturbed. To accomplish this, I provide on one or both sides of the cash-drawer and within the casing two parallel ratchets $p$ and $p'$, arranged one above the other and provided at one end thereof with a pivoted latch $p^2$, pivotally connected to the upper ratchet $b'$, and adapted to rest at its lower end on the base of the lower ratchet $p$. Pivoted to the drawer B about midway between the said ratchets is a pawl $p^3$, having a laterally-projecting spur $p^5$, adapted when in the proper position to engage in either of the ratchets $p$ or $p'$. The ratchet-teeth in these ratchets $p$ and $p'$ are formed opposite to each other, the lower ratchet being adapted to be engaged by the pawl as the drawer is forced outwardly, and the upper ratchet being adapted to be engaged by the pawl as the drawer is forced inwardly. Upon opening the drawer B the pawl $p^3$ engages with the respective teeth of the lower ratchet until the pawl passes under the pivoted latch $p^2$. If for any reason the drawer should be stopped before it has passed the pivoted latch $p^2$, it cannot be closed, because of the pawl engaging with the ratchet-teeth in the ratchet $p$. After the pawl has passed the pivoted latch $p^2$, however, as the drawer is closed the pawl will travel along said latch and be raised to the position indicated in dotted lines in Fig. 9, so as to engage with the ratchet-teeth in the ratchet $p'$. After it has been closed this far the ratchet-teeth in the ratchet $p'$ prevent the drawer from again being opened until it has been entirely closed, when the pawl $p^3$, having passed the end of the ratchet $p'$, will drop to its normal position on the ratchet $p$. By this construction sufficient movement of the drawer in either direction is insured in order to produce the proper movement of the registering-lever to insure the correct registration for the amount indicated on the keys.

In the upward forward part of the casing A A, in front of and above the counting and registering wheels, I provide a movable cover or door A', which is normally locked in its position, but adapted to be opened by the person whose business it is to count the cash in the cash-receptacle and compare it with the registration.

In checking off the amount registered by the machine the numbers indicated on the counting and registering wheels are to be read as one number—for instance, as is shown in the diagram in Fig. 16. The numbers on the counting and registering wheels in the units or cents column are 42 and 18. This would be read "4218." The numbers on the next or dime wheels are 28 and 09. This would be read "2809." The numbers indicated on the dollar series are 8 and 37, to be read "837." I preferably place a cipher before each of the figures less than 10 on each of the counting and registering wheels, in order to simplify the operation of checking off the numbers. Having taken off the numbers as thus indicated, we take the amount on the units or cents wheels, which would be 4218, point it off in the usual manner to divide into dollars, and we have $42.18. The next amount being dimes, we add one cipher on the right, then, beginning on the right, place the number thus formed under the other number. To the next number, which represents the dollars, we add two ciphers in the same manner and place it under the other two numbers, as indicated at X in Fig. 16. These amounts added up give the total amount registered on the machine, which in the example shown in the diagram would be $1,160.08.

In Fig. 1 I have shown the bell G adapted to be operated by the movement of a hammer $r$, pivoted on a suitable stud or rod $r'$ and attached to a spring $r^2$, which is adapted to operate against the hammer in both directions and hold it normally slightly away from the bell G. A spring-catch $r^3$ is adapted to engage with a hook projection $r^5$ on the hammer as the drawer is released and opened to draw back the hammer until disengaged by the spring-catch and permit the same to fly back by the action of the spring $r^2$ against the gong G, and thus sound an alarm.

In Figs. 17 and 18 I have shown a modified form of the bell, in which the hammer is adapted to come against a stop in one direction, a certain amount of elasticity in the hammer permitting it to strike against the gong G and rebound sufficiently to prevent rattling of the hammer against the bell, caused by the vibrations thereof. The spring in this case operates against the hammer in one direction only, which is opposite to the movement of the drawer in opening. The tension of this spring, of course, will be considerably less than the tension of the springs which operate the drawer.

It is obvious that the various constructions hereinbefore described may be variously modified to suit different sized and shaped casings and machines of different capacities. It is obvious, also, that some of the parts may be detached and operated for counting and registering without the use of the cash-receptacle. The cash-receptacle itself may be variously modified in form and operation to suit different conditions or the wishes and caprices of different purchasers and operators, suitable connection being made between the cash-receptacle and the registering device. I do not, therefore, desire or intend to limit myself to the exact constructions hereinbefore described and specified; but

I claim, broadly, as my invention—

1. The combination, with a series of numbered keys and a series of levers, one for each key, of a registering-wheel and a registering-lever adapted to engage therewith, and stop projections on each of said key-levers adapted when the key is depressed to form a stop for and determine the movement of said registering-lever, said registering-lever being adapted to be operated independent of said keys, substantially as specified.

2. The combination, with a registering-wheel and a registering-lever adapted to engage with and move said wheel when moved in one direction and to turn independently of said wheel when moved in the opposite direction, of a series of levers and keys, said levers being provided with stop projections of different lengths, each adapted when operated by its key to form a stop for and determine the movement of said registering-lever about the registering-wheel, and means for operating said registering-lever independent of said keys, substantially as specified.

3. The combination, with a series of keys and their indicators, one for each key, of a normally-closed cash-receptacle and a normally-inactive registering mechanism, said keys being adapted to be operated independently of said registering mechanism when the cash-receptacle is closed and said receptacle being adapted to be opened and closed independent of said keys and registering mechanism when the keys are in their normal position, spring-actuating mechanism for opening said cash-receptacle, means connected with said levers for releasing said registering mechanism and determining the amount to be registered thereon when the cash-receptacle is opened, and means for connecting said registering mechanism to the cash-receptacle when one key is moved to an unusual position, so that the registering mechanism will be caused to operate positively to register the amount indicated by closing the cash-receptacle, substantially as specified.

4. The combination, with a registering-wheel and a registering-lever, of a retaining-lever adapted to hold said registering-lever in its normal position, a series of keys and levers each adapted to operate said retaining-lever, and means connected with said levers for determining the movement of said registering-lever, said registering-lever being adapted to be operated independently of said keys and levers, substantially as specified.

5. The combination, with a normally-closed cash-receptacle and a normally-inactive registering mechanism adapted when released to be operated by the opening and closing of said cash-receptacle, of a retaining-lever for holding said registering mechanism in its normal position, and a series of keys and mechanism connected therewith to operate upon said retaining-lever to release said registering mechanism and determine the movement thereof when operated by the cash-receptacle, substantially as specified.

6. The combination, with a normally-inactive registering mechanism and a retaining-lever for holding the same in its normal position, of a normally-closed cash-receptacle adapted to be operated independent of said registering mechanism, a series of keys and levers adapted to operate upon said retaining-lever to release said registering mechanism, and means for determining the movement of said registering mechanism by the opening of said cash-receptacle when said keys are moved to an unusual position, said registering mechanism being adapted to be positively moved to register the amount by closing the cash-receptacle, substantially as specified.

7. In a cash-register, the combination, with a series of keys and indicators, of a normally-inactive registering mechanism and a normally-closed cash-receptacle, said keys and indicators being adapted to be operated independently of said registering mechanism when said cash-receptacle is in its normal position, a retaining-lever normally engaging with said registering mechanism, each of said keys being adapted to operate said retaining-lever to release said registering mechanism and cause the amount indicated by said key to be registered on said registering mechanism by the operation of the cash-receptacle when said key is moved to an unusual position, substantially as specified.

8. In a cash-register, the combination, with a series of keys and indicators, of a normally-inactive registering mechanism and a normally-closed cash-receptacle, said keys and indicators being adapted to be operated independently of said cash-receptacle, and said cash-receptacle being adapted to be operated independent of said registering mechanism when said keys and indicators are in their normal position, and means connected with each of said keys to release said registering mechanism and cause the amount indicated by said key to be registered on the said registering mechanism by the operation of said cash-receptacle when said key is moved to an unusual position, substantially as specified.

9. The combination, with a normally-closed cash-receptacle and two or more series of keys and indicators, of a registering mechanism for each series of keys and indicators, the keys in each or any series being adapted to be operated independent of the operation of the cash-receptacle and the cash-receptacle being adapted to be operated independent of the registering mechanism when said keys are in their normal position, and means connected with each key for releasing its registering mechanism to cause the same to be operated by the operation of the cash-receptacle when said key is moved to an unusual position, substantially as specified.

10. The combination, with two or more series of keys and a register for each series, of a normally-closed cash-receptacle adapted when the keys are in their normal position to be operated independent of said registers, a spring-actuating mechanism for opening said cash-receptacle, and means for connecting said cash-receptacle to the register of any or all the series when the key of that series is moved to an unusual position, so that the closing of said receptacle shall cause said register or registers to operate, substantially as specified.

11. The combination, with a series of numbered keys and levers, of a registering-wheel and a registering-lever adapted to travel a limited distance about said wheel, a retaining-lever for holding said registering-lever in its normal position, each of said keys and its lever being adapted to operate said retaining-lever, a normally-closed cash-receptacle adapted to engage said registering-lever when said registering-lever is released by said retaining-lever, and a stop projection on each of said key-levers to limit the movement of said registering-lever when its key is moved to an unusual position and when said cash-receptacle is opened, said registering-lever being adapted to be moved positively to its normal position by the closing of said cash-receptacle, and thus register the amount indicated by said key, substantially as specified.

12. The combination, with two or more series of keys, a pivoted lever for each key, and a registering mechanism for each series of keys, of an automatic catch for each series adapted to engage and retain one lever of said series when its key is moved to an unusual position, a releasing device for each registering mechanism adapted to be operated by any key of its series when engaged by said catch, a locking device adapted to engage and retain all the keys of any or all the series which remain in their normal position when the registering mechanism is operated, and means independent of said keys and levers for operating said registering mechanism and locking device, substantially as specified.

13. The combination, with a normally-closed cash-receptacle, of two or more series of keys and a register for each series, said keys being adapted to be operated independent of the opening and closing of said receptacle, the said cash-receptacle being adapted to be opened and closed independent of the operation of said registers when all the keys are in a normal position, means connected with each key for releasing the register of that series to cause the same to be operated by the opening and closing of the cash-receptacle, and a locking device adapted to be set in operation when said cash-receptacle is opened to lock said keys and levers, said locking device being adapted to unlock said keys and levers when the cash-receptacle is closed, substantially as specified.

14. In a cash-register, a normally-closed cash-receptacle, a series of keys, levers, and indicators, one lever and one indicator for each key, a normally-inactive registering mechanism, said cash-receptacle being adapted to be operated independent of said registering mechanism when the keys are in their normal position, said keys and indicators being adapted to be operated independent of said registering mechanism when said cash-receptacle is closed, means connected with each of said levers for releasing said registering mechanism to cause the same to be operated by the cash-receptacle when said lever is moved to an unusual position, and means, substantially as described, for locking all the levers in their respective positions when the cash-receptacle is opened, substantially as specified.

15. The combination, with a cash-receptacle, of a series of keys and their levers, an indicator for each key and lever, a registering-wheel having a series of ratchet-teeth and a registering-lever having a pawl adapted to engage with said teeth, an automatic catch adapted to engage with each of said levers when moved to an unusual position, said catch being adapted to release said lever when another lever is moved into engagement therewith, a retaining-lever adapted to release said registering mechanism when any of said keys are depressed, so as to cause its lever to engage with said catch, and stop projections of different lengths on each of said levers adapted when said lever is engaged by said catch to form a stop for said registering-lever to cause the same when operated to move a number of notches corresponding to the number of the key attached to said lever, said registering-lever being adapted to be returned to its normal position, and thus revolve the registering-wheel by the closing of said cash-receptacle, substantially as specified.

16. The combination, with a cash-receptacle, of a series of keys and their levers, a registering-wheel and lever, stop projections of different lengths on said levers, each adapted when its key is depressed to form a stop for said registering-lever, and a retaining-lever adapted to be acted upon by said key-levers to release said registering-lever by the operation of the respective keys to permit said lever to move against said stop projection when the cash-receptacle is opened, said registering-lever being adapted to be returned to its normal position, and thus move the registering-wheel when the cash-receptacle is closed, substantially as specified.

17. The combination, with a cash-receptacle, of a registering-wheel and registering-lever, said registering-lever being normally held out of engagement with said cash-receptacle by a retaining-lever, a series of keys each adapted to act on said retaining-lever to release said registering-lever to cause the same to come into engagement with said cash-receptacle, means connected with each key to determine the movement of said registering-lever when the cash-receptacle is opened, and a locking device set into operation by the opening of said cash-receptacle to lock the keys in their respective positions, all of the parts being adapted to be returned to their normal positions by the closing of said cash-receptacle, substantially as specified.

18. The combination, with a sliding cash-drawer, of a pivoted pawl attached thereto, ratchet-teeth arranged in two parallel rows at the side of said drawer, the teeth in each row being inclined in opposite directions, as set forth, and a pivoted latch connecting the respective rows of ratchet-teeth, whereby said pawl is made to travel over one row of teeth in moving in one direction and over the other row of teeth in moving in the opposite direction, substantially as specified.

19. The combination, with a series of numbered keys, levers, and indicators, a lever and indicator to each key, of a normally-inactive registering mechanism and a retaining-lever adapted to be engaged by each of said pivoted levers when its key is moved to an unusual position, said levers being adapted to be engaged by a swinging catch when moved against said retaining-lever, said catch being adapted to be operated to release the levers retained thereby when another is moved against the same, substantially as specified.

20. The combination, with a series of pivoted levers, their keys, and indicators, each of said levers being provided with a stop projection $b^3$ of a different length, as described, of a registering-wheel and a registering-lever adapted to operate the same, a pivoted retaining-lever $F^3$, to engage said registering-lever, a swinging catch $F^4$, pivoted locking device $F^5$, and a reciprocating cash-drawer adapted to engage with and operate said registering-lever and said locking device, substantially as specified.

21. The combination, with a normally-closed cash-receptacle, of a registering-wheel and a registering-lever, a series of keys and levers having stop projections of different lengths, each adapted when moved to an unusual position to limit the movement of said registering-lever, a catch for engaging said levers, a releasing device operated by said keys to release said registering-lever, a retaining-catch for said receptacle, spring-actuating mechanism for opening said receptacle when released by said catch, and a locking device for locking all the levers in their respective positions when said cash-receptacle is opened, said registering-wheel being adapted to be moved by said registering-lever, and the various parts being returned to their normal position when said cash-receptacle is closed, substantially as specified.

22. The combination, with the wheels F and F', of an oscillating worm-gear connected to one of said wheels and engaging with a worm or cam-shaped flange on the other, and a movable arm embracing said gear and adapted when in one position to hold the same into engagement with said worm and when in another position to throw it out of engagement with said worm, substantially as specified.

23. In a cash-register, the combination, with the keys and operating-levers, of the indicators connected to each of said levers, said indicators being each formed of a metallic plate having inturned ends or edges to form guides therefor, substantially as specified.

24. The combination, with the operating-levers and the indicators, of a connecting-link having a straight side and a curved arm with a projecting stud to engage with an opening in said lever, substantially as specified.

25. The combination, with an operating-lever and its indicator, of a connecting-link having a bifurcated end adapted to embrace said lever, one branch of said bifurcation being provided with a projection to enter an opening in said lever, substantially as specified.

26. The combination, with the lever $b$ and an indicator $b^2$, of a link $b'$, having a straight side $b^5$, curved arm $b^7$, and projection $b^{11}$, substantially as specified.

27. In a cash-register, a series of indicators adapted to operate adjacent to each other, said indicators being formed with inturned edges $h'$, substantially as and for the purpose set forth.

28. The combination, with a spring-operated cash-receptacle, of a registering mechanism adapted to be operated thereby when released by the operating-keys, a locking device adapted to retain said keys in the relative positions when said cash-receptacle is opened, and an alarm set in operation by the opening of said cash-receptacle, substantially as specified.

29. The combination, with a cash-receptacle and a registering mechanism, of a registering-wheel and a counting-wheel, a registering-lever normally disconnected from said cash-receptacle, but adapted when released to be operated thereby, operating-keys for releasing and determining the movement of said registering-lever, a spring-catch for retaining said cash-receptacle, and spring-actuated arms adapted to open said cash-receptacle when released by said catch, said registering-lever being moved against said registering-wheel when the cash-receptacle is closed, substantially as specified.

In testimony whereof I have hereunto set my hand this 20th day of January, A. D., 1890.

SERN PERLEY WATT.

Witnesses:
C. C. SHEPHERD,
BARTON GRIFFITH.